G. R. DREW.
Hub and Axle for Vehicles.
No. 163,305. Patented May 18, 1875.
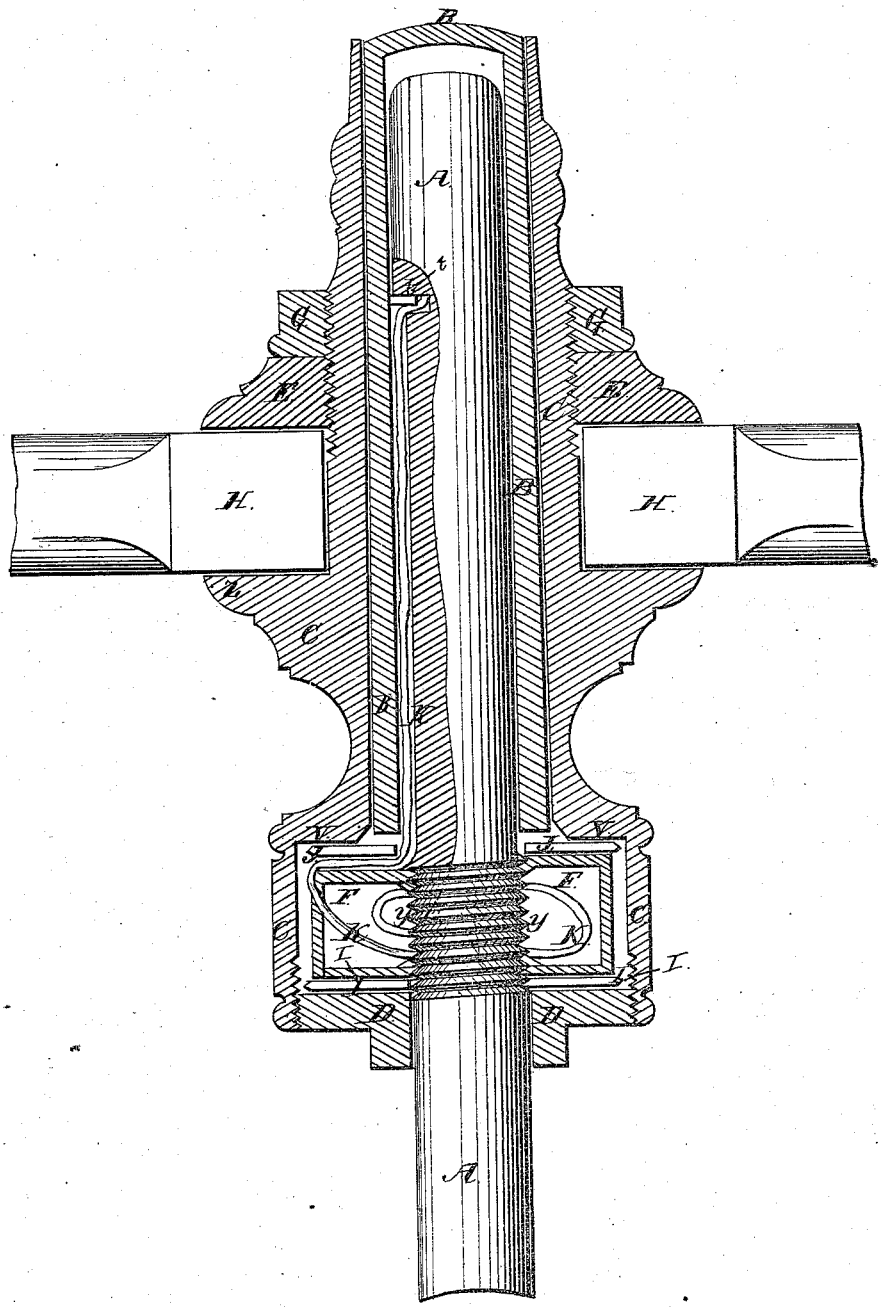
Attest:
W. M. Gooding.
D. H. Crawford.
Inventor:
George R. Drew.

UNITED STATES PATENT OFFICE.

GEORGE R. DREW, OF MILLBURN, NEW JERSEY.

IMPROVEMENT IN HUBS AND AXLES FOR VEHICLES.

Specification forming part of Letters Patent No. 163,305, dated May 18, 1875; application filed August 25, 1874.

*To all whom it may concern:*

Be it known that I, GEORGE R. DREW, of the town of Millburn, State of New Jersey, have invented an Improved Metallic Hub for Carriage-Wheels, of which the following is a specification:

The improvements relate to convenience in inserting, holding, and adjusting the spokes, and for ease of replacing a new box for the axle when one becomes worn; to the manner of retention of the hub on the axle; and to the lubrication of axle and box. They consist in construction, adaptation, and combination of the various parts so as to attain the desired results.

The accompanying drawing is a section lengthwise through the middle of the hub and its appurtenances.

C is the body of the hub, which has a collar, Z, as an integral part. E is a loose collar; G, a screw-nut, the thread being in the body of the hub. Dispensing with mortises and partitions the spokes are placed between the collars Z and E, their sides, radiating from the center, touch each other in between and as far above the collars Z and E as the size of the spokes require. When from use spokes wear loose at the felly, the nut G and the collar E being removed, wedges can be introduced between the hub C and spoke H, that will be prevented from getting out by the collar E, avoiding the trouble and expense of resetting the tire. The axle-box B is inserted in the hub, its outside and the bearing in the hub being slightly tapering, to give the box a solid bearing in the hub, at the same time being easily forced out when so worn as to need a new box in its place. The outer end of the box B is closed, as shown, to prevent lubricating-oils from disfiguring the end of the hub. Screwed tightly on the axle A, near its inside end, is a thick hollow collar, F. A shoulder, V, inside the hub, comes to the collar, a leather washer, *j*, intervening to prevent noise. The large end of the hub extends over the collar far enough to admit the screw D to enter the hub and come in contact with the collar F, the leather collar I intervening, thus holding the hub upon the axle. The hollow collar F forms a reservoir for lubricating-oil, which is conveyed to the inside of the box B by the wick K passing out at the top of the collar F to a recess in the face of the collar, passing down to a groove provided in the axle, the end secured with a peg, as at *t*.

I am aware of the use of fast and loose collars being used to retain spokes in metallic hubs, the collars being drawn together by screw-bolts passed through both collars.

What I claim as my improvement is—

The combination of the box B with the hub C, and an axle, A, having upon it the hollow collar F, substantially as specified and shown.

GEORGE R. DREW.

Witnesses:
 W. M. GOODING,
 D. H. CRAWFORD.